United States Patent Office

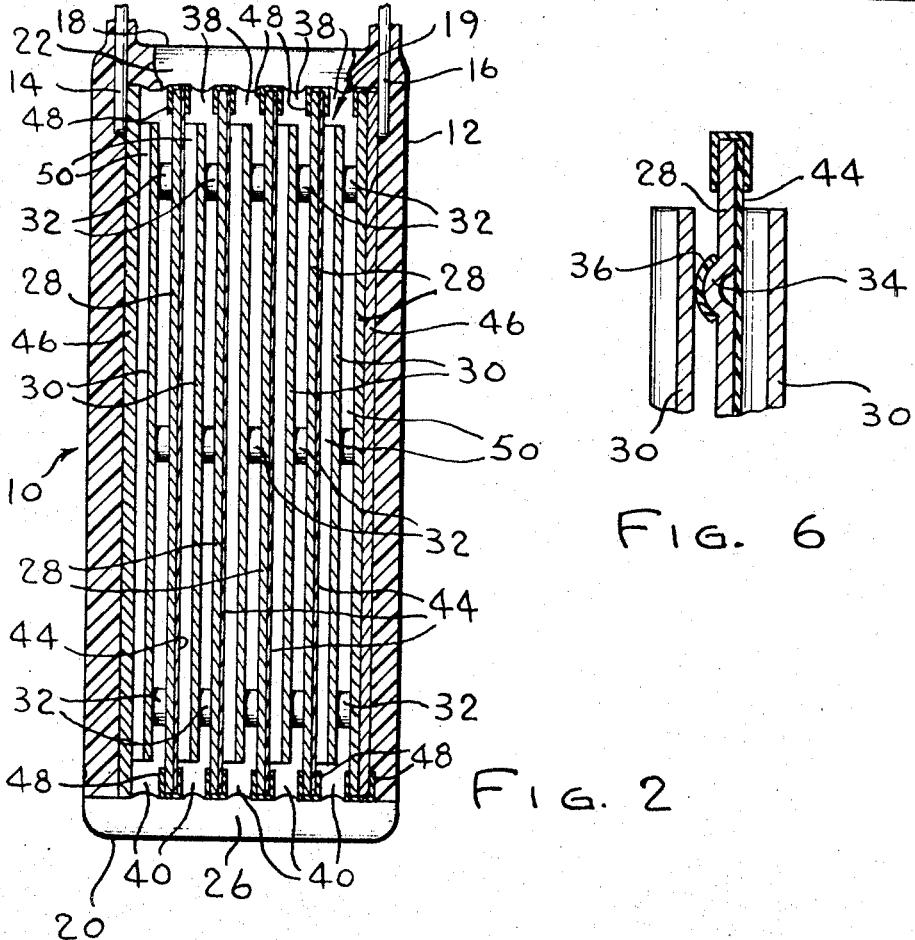
FIG. 2
FIG. 6
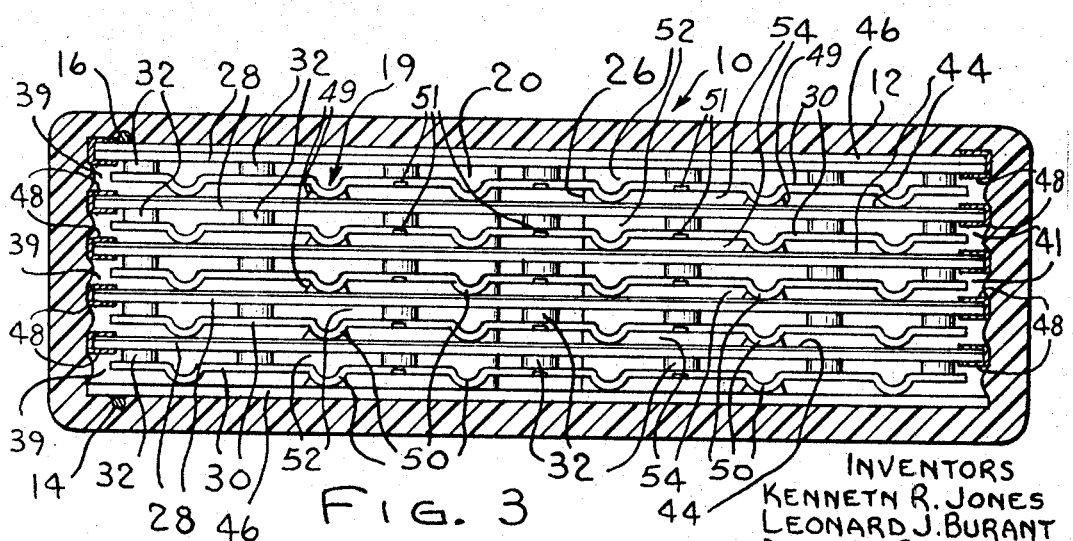
FIG. 3
INVENTORS
KENNETH R. JONES
LEONARD J. BURANT
DONALD R. WOLTER
BY *Gerald Forta*
ATTORNEY

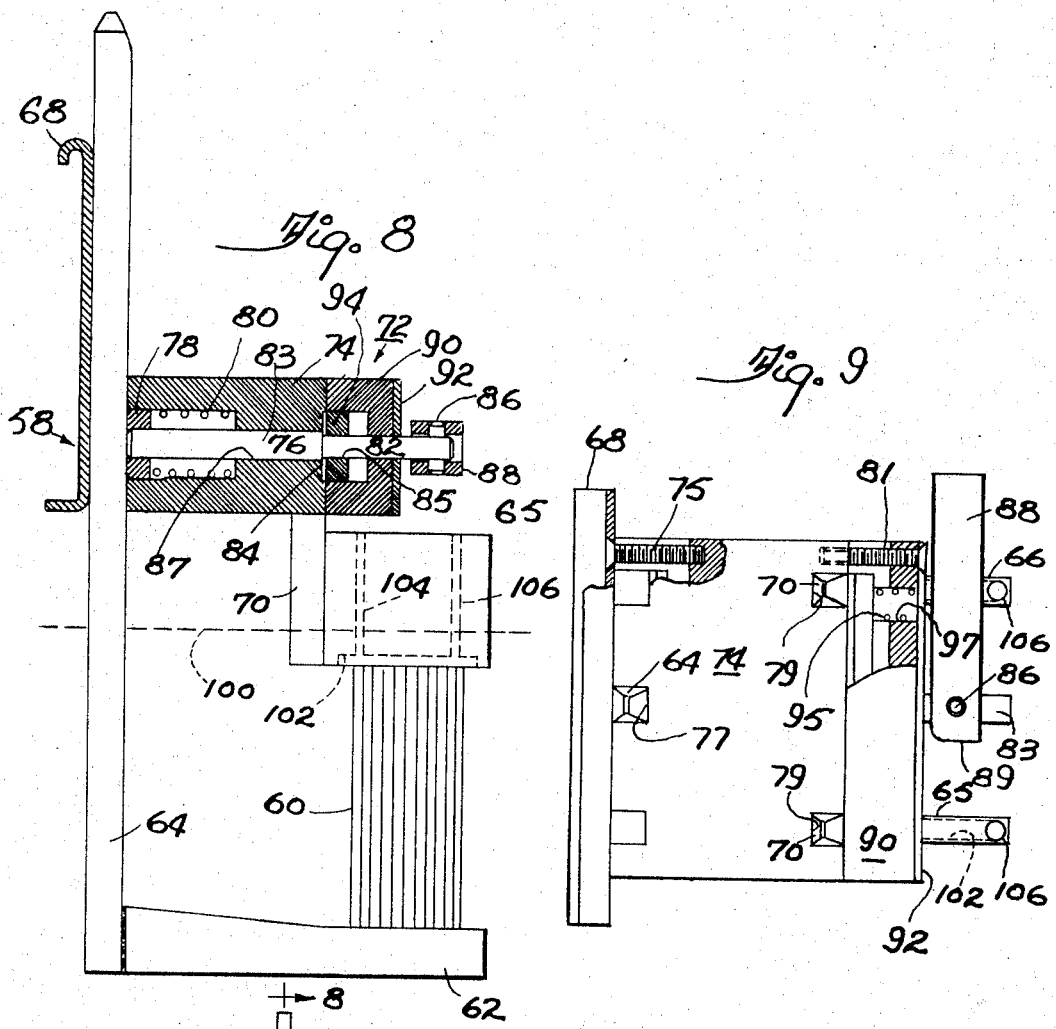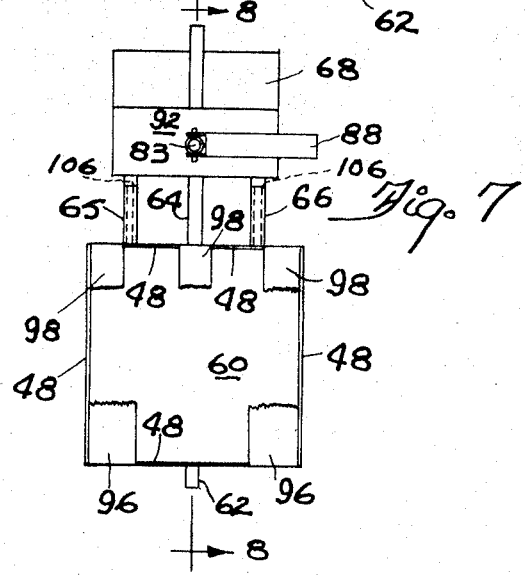

3,451,855
Patented June 24, 1969

3,451,855
DEFERRED ACTION BATTERY
Kenneth R. Jones, Mequon, and Leonard J. Burant and Donald R. Wolter, Milwaukee, Wis., assignors to Globe-Union Inc., Milwaukee, Wis., a corporation of Delaware
Continuation of application Ser. No. 287,171, May 29, 1963. This application Sept. 13, 1966, Ser. No. 579,171
Int. Cl. H01m *17/06*
U.S. Cl. 136—90     20 Claims

ABSTRACT OF THE DISCLOSURE

In an improved action battery having cells, each comprising an anode, a cathode, reactive space therebetween, and means for providing ingress of electrolyte to the reactive space, improved structural features which may include nonreactive space for thermal purposes, a unique unitary casing, unique communicating chambers between the spaces, unique electrode configurations to define the spaces without distortion of the electrodes, and combinations of these and other features.

---

This invention relates to deferred action batteries and, more particularly, to such batteries as are adapted to be activated upon immersion in sea water. This application is a continuation of application Ser. No. 287,171, filed May 29, 1963 for "Deferred Action Battery," now abandoned, which is in turn a continuation-in-part of application Ser. No. 234,938, filed Nov. 2, 1962, for "Deferred Action Cell," now abandoned.

In accordance with conventional practices, such batteries are usually made up of a plurality of cells each cell comprising a magnesium allow anode and a silver chloride cathode with a suitable spacing medium positioned between the anode and cathode of each cell, e.g. a bibulous sheet or a plurality of nylon lines attached to either the anode or the cathode. One particularly undesirable feature of the generally accepted anode-cathode spacing mediums is that they restrict the flow of electrolyte between the anode and cathode and materially reduce the area of active material available for reaction as they cover relatively substantial areas of the anode and cathode which the electrolyte is unable to wet.

The anodes, cathodes and spacers are arranged to provide a plurality of cells, substantially enclosed by a battery casing which in prior structures has taken the form of an assembly of glued, molded parts in one instance and a taped enclosure in another. Any such casing must have openings for the egress and ingress of the activating fluid. The completed battery structure is activated by immersion in sea water, or other like electrolytes. Such batteries when immersed by means of air drops into the open sea, for example, may be exposed to extreme changes in temperature, and it has been observed that the sectionalized glued or taped casing is undesirable for use in such environments. Due to the inability and impracticality of holding extremely close tolerances in the manufacture of the molded parts, a battery casing made up of glued, molded parts results in a loosely fitting interior battery structure which appreciably increases its susceptibility to intercell leakage; also, gluing the molded parts introduces stress areas which are incapable of withstanding the temperature changes to which the battery may be exposed and the casing may develop cracks under such conditions, again increasing intercell leakage. Furthermore, the assembly of molded parts to form a casing represents a considerable cost. The taped casing is also costly from an assembly standpoint and is highly susceptible to intercell leakage. It is well recognized that chemical and electrical isolation between cells of a multicell battery is essential and that intercell leakage reduces the useful life of a battery.

Defererd action batteries activated by immersion in sea water, and especially immersion by dropping from an aircraft, are exposed to low temperatures and as such are highly susceptible to electrolyte freezing. For example, a battery at —20° C. may enter sea water at 0° C. but having a salinity of 1½% so that the water is just above its freezing point. Under such conditions the electrolyte (sea water) freezes immediately upon entering the cold battery with the result that battery activation is delayed until such time as the battery temperature rises to the ambient water temperature and electrolyte melts.

An object of this invention is to increase the useful life of a deferred action battery.

Another object of this invention is to provide a battery construction which minimizes, if not completely eliminates, intercell leakage.

A further object of this invention is to provide a deferred action battery which resists the freezing of electrolyte as it enters the battery under conditions where the battery is immersed in electrolyte which is at a temperature immediately above the freezing point of the electrolyte while the battery is at a temperature considerably below that freezing point.

Another object of this invention is to provide a battery construction which provides for free flow of the electrolyte and complete and rapid distribution of electrolyte throughout each cell of the battery.

A further object of this invention is to provide a battery construction which includes an effective arrangement for maintaining anode-cathode spacing without materially reducing the active area of the electrodes, and also one which does not interfere with flow of electrolyte in the battery.

Another object of this invention is to provide an economical and readily assembled battery construction.

A further object of this invention is to provide a deferred action battery which is activated by immersion in sea water and which functions at the maximum voltage per cell over a wide range of temperatures and salinity of the electrolyte, and over a wide range of current values.

Another object of this invention is to create within a free electrolyte type battery a system for increasing the rate of flow of electrolyte therethrough to augment battery cooling and purging of contaminants.

A further object of this invention is to provide all of the above objects while maintaining a relatively simple and economical battery structure.

Another object of this invention is to provide an improved method for the manufacture of deferred action batteries.

These and other objects and advantages will be manifest from an examination of the specification, claims and drawings.

In accordance with one embodiment of the invention, there is provided a battery made up of a plurality of cells wherein anode-cathode spacing is maintained by a plurality of projections disposed between the anode and the cathode. These projections provide the desired cell spacing without appreciably interfering with the active area of the electrodes or the flow of electrolyte. To facilitate assembly of the battery, the cells are made up of a plurality of subassemblies each consisting of an anode and cathode so that when the sub-assemblies are arranged in the battery each provides an anode for one cell and a cathode for an adjacent cell. Each of the assemblies also include a conductive, impermeable partition which is arranged to chemically isolate the anode and cathode of each subassembly, thus to isolate adjacent cells in the assembled battery, while providing a low resistance electrical connection therebetween. Preferably a one piece casing is provided and intimately engages the sub-assemblies to provide a tight battery structure, minimize intercell leakage and provide a stress free casing. Electrolyte distribution within the battery is facilitated by providing a manifold area in the assembled battery which communicates with and distributes electrolyte to the cells. A relatively large volume nonreactive area is provided between adjacent cells to admit a sufficient volume of electrolyte to the battery to warm the battery and resist freezing of the electrolyte. With such an arrangement, the distance between the anode and cathode in the reactive area is held to a minimum, which is desirable when sea water is the electrolyte, while providing for admission of sufficient electrolyte to warm the battery and resist freezing.

Reference will now be made to the accompanying drawings, in which:

FIG. 2 is a cross-sectional view along line 2—2 of FIG. 1;

FIG. 3 is a cross-sectional view along line 3—3 of FIG. 2;

FIG. 4 is an exploded perspective of one of the cell sub-assemblies of the embodiment illustrated in FIG. 1;

FIG. 5 is a front elevation of an alternative anode plate;

FIG. 6 is a fragmentary cross-sectional view of an embodiment of the invention using the plate of FIG. 5;

FIG. 7 is a front elevation of a jig for holding the assembled battery while forming the battery casing;

FIG. 8 is a cross-sectional view of the apparatus of FIG. 7, taken along the section 8—8; and FIG. 9 is a plan view of the apparatus of FIGS. 7 and 8.

Figure 1:
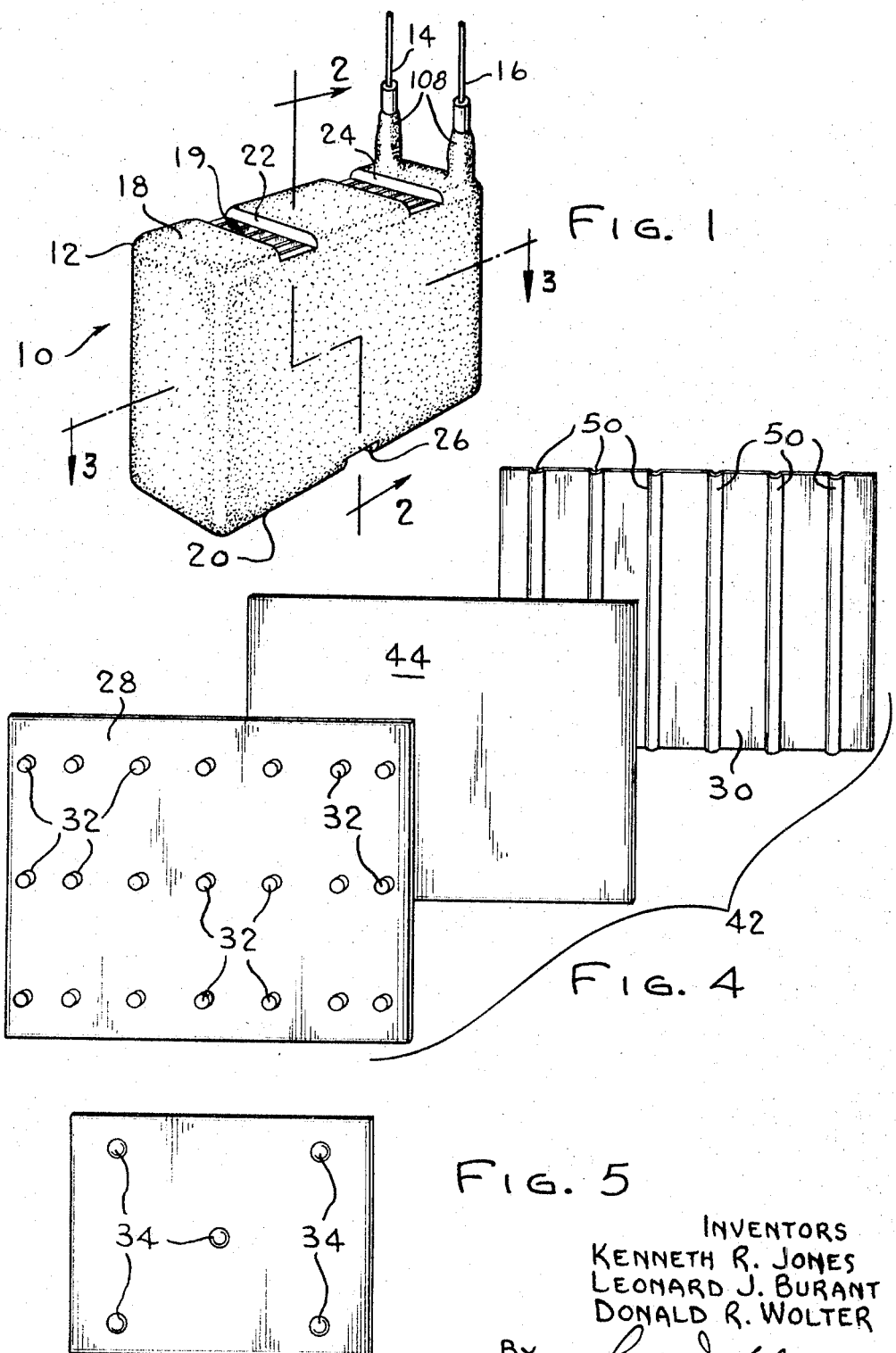
FIG. 1 is a perspective view of a preferred embodiment constructed in accordance with the present invention.

Referring now to the drawings, a deferred action battery 10 is illustrated as including an outer casing 12 and a pair of electrical leads 14 and 16 connected to the battery cell assembly 19 in a manner to be more fully described hereinafter. The casing 12 is generally rectangular in shape, and, as viewed in the drawings, includes opposed upper and lower surfaces 18 and 20. The casing 12 is provided with water ports 22, 24 and 26 so that, as battery 10 is immersed in sea water, the sea water is admitted to the interior of the battery as an electrolyte to activate the battery. It will be appreciated that the number and location of water ports can be varied as desired. As illustrated, two water ports 22 and 24 are provided in the upper face 18, and one centrally located port 26 is provided in the lower face 20.

The battery cell assembly is made up of a plurality of cells each comprising an anode 28 and a cathode 30. In accordance with well accepted practice, the anode comprises a magnesium alloy the surface of which is specially treated, e.g. wire brushed or pickled in a suitable chromate bath, and the cathode comprises a fused silver chloride sheet the surface of which has been reduced to form a conductive coating of silver.

A plurality of spacers 32 are positioned intermediate the anode and cathode to maintain a predetermined spacing therebetween. In the preferred embodiment, these spacers take the form of pieces of a suitable insulation. The tape is cut into minute portions so as to engage only a limited area of the anode and cathode. Thus, a predetermined spacing between the anode and cathode is maintained while providing a substantially open area therebetween so that free flow of electrolyte to all areas of the anode and cathode is not obstructed and without appreciably reducing the active areas of the anode and the cathode which take part in the battery reaction.

In FIGS. 5 and 6 an alternative spacing construction is illustrated. Here a number of projections 34 are formed in either the anode or the cathode (in this instance, in the anode). These projections extend between the anode and the cathode and include a suitable insulating coating 36 on their outermost portion to engage the cathode. Such a coating can be a paint or varnish having as a base common vinyl polymers or epoxy resin polymers, or may alternatively be a small piece of a thin insulating material.

The electrodes 28 and 30 are generally rectangular in shape, and the perimeter of the cathodes 30 is less than, and lies wholly within, the perimeter of the anodes 28, the outer margin of the anodes extending outwardly of that of the cathodes and engaging the interior surface of the casing 12. The interior surface of the casing 12 is spaced from the cathodes to provide manifold chambers 38 nad 40, which communicate with the water ports 22, 24 and 26, and extend generally coextensively with the upper and lower portions of the battery cells. These manifold chambers insure rapid and complete distribution of electrolyte throughout the various cells, and between the cells, as the battery is immersed in water. The advantage of this feature is perhaps best appreciated when it is kept in mind that the size of the area between adjacent anodes and cathodes is exaggerated in the drawings and that actually it is a relatively small space through which electrolyte is not readily distributed. The electrolyte, in addition to penetrating the cell areas immediately adjacent the water ports 22, 24 and 26, also spreads through the manifold chambers 38 and 40 and traverses and completely penetrates the spaces between the electrodes 28 and 30, accordingly, by providing the manifold chambers 38 and 40, and by ulitizing spacers 32 which do not impede electrolyte flow within the cells, the start-up time for the battery is materially reduced and a more effective operating battery is provided. Furthermore, the manifold chambers 38 and 40 and the spacers 32 enocurage more uniform circulation of electrolyte throughout the battery, which circulation normally occurs during operation. It has been observed that the useful life of deferred action batteries so constructed is increased approximately 25 to 50 percent. As shown in FIG. 3 of the drawings, the casing is also spaced from the vertical margins of the cathodes 30 so that vertical chambers 39 and 41 are also provided in the battery. It will be appreciated that, although desirable, these chambers can be eliminated by extending the vertical edges of the cathode to engage the interior surface of the casing.

Although, in the embodiment illustrated, the outer margins of the anodes 28 engage the interior surface of the casing 12 while the outer margins of the cathodes 30 are spaced therefrom, the cathodes may instead extend beyond the anodes to accomplish the same result of forming the manifold chambers 38 and 40. Alternatively, if the partitions 44 are self supporting, only they need contact the interior surface of the casing to prevent intercell leakage. It is convenient, however, to form the partitions 44 of metal foil, and so some supporting structure is necessary.

To facilitate assembly and to maximize the repeatability of cell structures, the cell assembly 19 is built up of a plurality of sub-assemblies 42 (FIG. 4). Each subassembly 42 includes an anode 28 and a cathode 30 with a cell partition 44 positioned therebetween. The partition 44 is preferably silver foil, or a silver plated foil of a base metal such as copper, and is impermeable to the electrolyte and does not take part in the battery reaction. Preferably, the partition 44 is attached to the anode 28 by a peripherally extending strip of tape 48 and the cathode 30 is attached to the partition 44 by means of small spots of a suitable adhesive 49 so that an integral subassembly is provided. The tape 48 is a suitable plastic pressure sensitive tape made of a polyester, and forms a fluid seal to prevent seepage of the electrolyte between the partition and the anode. Preferably, the foil partition is also soldered or welded to the anode to insure a good electrical connection therebetween. The spacers 32 are secured to the surface of the anode 28 by a suitable adhesive. The sub-assemblies 42 are arranged so that each provides a cathode 30 for one cell and an anode 28 for the next adjacent cell, with a partition 44 between adjacent cells, the projections 32 providing spacing between the anode and cathode of each cell. Such a construction greatly facilitates assembly of the battery and, since the cell components can be arranged prior to assembly in the battery and taped together prior to forming the casing, more consistent and efficient battery characteristics can be maintained. As viewed in FIG. 2 the left end of the cell assembly is formed by an end plate 46, preferably of silver plated copper, having a cathode 30 attached thereto. The right end of the cell assembly comprises an anode 28 carrying projections 32 and a second end plate 46 connected to the anode by a strip of tape 48. Leads 14 and 16 are soldered to the left and right end plates and a suitable electrical bond is formed between the end plates and their respective anode and cathode by welding or soldering.

As illustrated in FIG. 3, the cathodes 30 are provided with vertically extending protuberances or grooves 50. These grooves each engage the partitions 44 on one side and open toward the anodes on the other side. The projections 32 provide a reactive area 52 between the anode and the cathode of each cell, and the grooves 50 maintain a non-reactive area 54 between each pair of adjacent cells. These non-reactive areas 54 are larger in cross-sectional area than the reactive areas 52, and provide for admission of sufficient quantities of electrolyte to the battery so that in those instances where the battery, at a temperature considerably below the freezing point of the electrolyte, is immersed in electrolyte which is just above its freezing point, sufficient amounts of electrolyte are admitted to the battery to raise its temperature and prevent electrolyte freezing. More particularly, the non-reactive areas 54 act in the nature of radiators to heat the battery and the reactive areas to prevent electrolyte freezing.

It will be appreciated that the grooves are simply one method of providing the non-reactant areas between adjacent cells and that other suitable expedients may be utilized. However, the use of grooves is preferred as they possess the additional advantage of facilitating electrolyte flow through the battery. More particularly, in addition to the well known battery reaction, a side reaction occurs which may be expressed by the following equation:

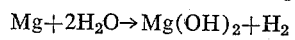

$$Mg + 2H_2O \rightarrow Mg(OH)_2 + H_2$$

The $Mg(OH)_2$ produced by this side reaction is only slightly soluble and the liberation of hydrogen, which occurs at the anode, induces a circulation of electrolyte through the battery. The liberated hydrogen rises through the reactive areas 52, thus expelling fluid above it, and pulling in fresh electrolyte below it. This "chimney effect" circulation tends to flush the $Mg(OH)_2$ from the battery, along with any other foreign substances which might tend to clog the battery and retard the main battery reaction. The water ports 22, 24 and 26 provide for ready ingress and egress of water. The vertically extending grooves 50 assist the chimney effect electrolyte circulation in that they reduce resistance to the flow of electrolyte and hydrogen through the battery, by increasing the ratio of the cross-sectional area of the reactive areas 52 to the length of its cross-sectional perimeter, and by providing space for relatively large bubbles of hydrogen to rise without contacting the surface of the cathode 30. Thus, resistance to water flow into and through the battery is substantially reduced to insure a clean and unclogged battery interior and one which effectively resists electrolyte freezing.

A plurality of smaller vertically extending recesses or grooves 51 are provided in the surface of the cathodes 30 which face the partitions 44, at locations between the grooves 50. The grooves 51 reduce the tendency of the cathode 30 to assume an arcuate or curved form when the grooves 50 are formed. The provision of the alternately disposed grooves 50 and 51 on opposite sides of the cathodes maintains the cathodes 30 relatively flat and reduces stresses in the assembled battery.

Batteries of this type may be called upon to operate over a wide range of conditions. When used in sea water, for example, the electrolyte may vary in temperature from —1° to +32° C. and the salinity may vary from 1½% to 3½%. The battery may be called upon to furnish a current of 900 ma. or more per square inch of cathode. It has been observed that the chemistry of this type of battery is such that cell polarization is a minimum so that the internal resistance of the battery is principally the ohmic resistance of the electrolyte contained in the reactive area between the anode and cathode. Therefore, it is desirable to provide a minimum distance between the anode and cathode to minimize internal battery resistance and to enable the battery to function well at the maximum voltage per cell over a wide range of temperatures and electrolyte salinity, as well as over a wide range of current values.

The present invention thus harmonizes two seemingly conflicting design considerations which are providing a minimum spacing between the anode and cathode of each cell, and providing for the admission of sufficient amounts of electrolyte to the battery for warming the battery to prevent electrolyte freezing. By providing the relatively larger non-reactive areas electrolyte is admitted to the battery in sufficient amounts to warm the battery and prevent freezing, while still providing an optimum distance between anode and cathode, e.g. 0.01 inch. Furthermore, by providing the vertical grooves 50 which open into the reactive area, the cross-sectional area of the reactive area is substantially increased while the short distance between the anode and cathode is maintained over most of the active areas of these electrodes.

The casing 12 is preferably formed about the arranged sub-assemblies 42 by dipping the arranged sub-assemblies 42 in a suitable plastic material for a short time, whereby the casing formed is of one-piece construction and intimately engages the outer margins of the anode 28 and spacers 44 of each of the sub-assemblies 42. Any plastic capable of formation about the battery and capable of withstanding atmospheric temperatures in flight and exposure to sea water would be appropriate. One especially satisfactory material is cellulose acetate butyrate plasticized with dioctylphthalate. With this material maintained at about 320° F. is has been found that the plastic properly engages the interstices of the battery about as shown in FIGS. 2 and 3 and an appropriate casing build-up is attained with the battery immersed in the fluid plastic for about three seconds. The temperature can vary from about 300 to about 350° F. and satisfactory casings will be produced, especially if the timing is regulated accordingly. With the one-piece molded casing there are no areas of high stress concentration thereby reducing the susceptibility of the casing to cracks and leaks when exposed to extremely low temperatures or to rapid changes in ambient temperatures. Furthermore, the intimate engagement between the casing 12 and the anodes 28 and the partitions 44 provides a rigid structure. The engagement between each of the anodes and partitions and the casing 12 also isolates each cell so that the only possible transference of electrolyte between the cells is through the water ports 22, 24 and 26.

When suitably arranged sub-assemblies 42 are dipped, the plastic intimately engages the outer margins of the anodes 28 and the partitions 44, and terminates in spaced relation from the cathodes 30 to provide the manifold chambers 38 and 40. As illustrated, the plastic extends partially around the sides of the anodes 28 and the partitions 44 to hold the same in place and contribute to the structural strength of the cell assembly. The distance the plastic extends into the manifold areas can be controlled by controlling the viscosity of the plastic.

Various other expedients may be used to control the penetration of plastic between sub-assemblies 42; for example, a portion of tape (not shown) may be provided on the periphery of the arranged sub-assemblies, either completely around the cell assembly, or on its upper and lower margins alone as desired. Such tape, of course, prevents penetration of the plastic during dipping beyond the tape surface.

The water ports 22, 24 and 26 are automatically formed and connected with the manifold chambers 38 and 40 by holding the assembly in a jig 58 (FIGS. 7 to 9) while it is dipped to form the casing 12.

The battery assembly is shown diagrammatically at 60 and comprises a plurality of alternately arranged anodes and cathodes together with partitions and spacers as described above. The battery is supported between a lower arm 62 of the jig 58, and a pair of upper arms 65 and 66, respectively positioned adjacent the lower and upper edges of the assembled battery, to prevent the plastic from contacting the assembly in the vicinity of the ports 22, 24 and 26. The lower arm 62 is fixed to a vertically extending bar 64, while the upper arms 65 and 66 are releasably clamped to the same bar 64, to permit relative movement between the lower arm 62 and the upper arms 65 and 66. An assembly 60 may thus be placed in position and then securely clamped between the upper and lower arms. Each upper arm is connected to a bar 70, which is releasably held in a clamp 72. The clamp 72 is in turn releasably clamped to the bar 64.

The clamp 72 comprises a rear block 74 secured to a bracket 68 by screws 75 on each side of the bar 64. The rear block 74 is provided with a first cut out portion 77 adjacent the bracket for receiving the bar 64 in slidable relationship, and a pair of second cut out portions 79 adjacent a front block 90 for receiving the bars 70 in sliding relationship. The front block 90 is secured to the rear block 74 by screws 81, and a face plate 92, having a hardened surface, is also secured to the front block 90 by the screws 81.

The rear block 74 is provided with a horizontally extending recess disposed in the face adjacent the bracket 68, and a rear clamp member 78 is disposed in this recess and is urged against the bar 64 by a coil spring 80. A similar recess is provided in the rear face of the front block 90, and a front clamp member 94 is disposed therein and is urged against the bars 70 by a pair of coil springs 95 (only one of which is shown in FIG. 9), each mounted in a separate bore 97 in the front block 90. A bore 85 extends horizontally through the front clamp member 94 and the front block 90, and an axially aligned, enlarged counterbore 87 extends through the rear clamp member 94 and the rear block 74. The bores 85 and 87 receive a shaft 83 having a front portion 82 and an enlarged rear portion 76, separated by a shoulder 84 which is positioned immediately to the rear of the front clamp member 94. The rear portion of the shaft 83 is secured to the rear clamp member 78 by an interference fit with its bore, but is slidably mounted with respect to the front and rear blocks 74 and 90, and the front clamp member 94.

The terminal end of the front portion 82 of the shaft 83 is provided with a pin 86 in pivotal relationship with a handle 88. As best seen in FIG. 9, the handle 88 may be rotated clockwise with respect to the pin 86, whereupon the end of the handle 88 engages the hardened face plate 92, and withdraws the shaft 83 toward the front of the jig against the force of the springs 80 and 95.

The withdrawal of the shaft 83 releases the rear clamp member 78 from clamping engagement with the bar 64, and the shoulder 84 of the shaft 83 engages the rear face of the front clamp member 94 to also release it from clamping engagement with the bars 70. Thus the clamp mechanism 72, and the bars 70 which hold the upper arms 65 and 66, may each be moved independently of each other. The relatively flat end face 89 of the handle 88 holds the clamp 72 in a disabled condition as long as desired. Returning the handle to the position shown in FIGS. 7 to 9 simultaneously re-engages both clamps.

In FIG. 7, the peripheral tape 48, used to secure the anodes 28 to the partitions 44 is shown and the assembly 60 is secured in assembled relationship by tape strips 96 and 98 at the bottom and top of the assembly, respectively. The strips 96 and 98 serve to hold the assembly 60 together while it is being dipped in the plastic casing material, and are so disposed as to leave the locations of the water ports, which are adjacent the arms 62, 65 and 66, free of tape.

When the assembly 60 is dipped, the casing material rises relative to the battery to about the broken line 100 in FIG. 8, whereby the entire assembly is coated with the casing material. The casing material, which is solid at room temperature, is held at a temperature just above its melting point so that the introduction of the assembly cools a film of plastic material surrounding the assembly sufficiently to solidify it. The amount of time that the assembly is held submerged in the plastic is not critical, but it must be short since too long a submergence of the assembly within the plastic causes the assembly to be warmed to the point where the plastic will no longer congeal on the assembly. The times and temperatures involved with the use of the various plastics which may be employed are well known to those skilled in the art, and therefore need not be specifically described.

The upper arms 65 and 66 are each provided with a recess 102 in the lower surface thereof, and a pair of upwardly extending bores 104 and 106. The recesses 102 and the bores 104 and 106 provide a mechanism for venting the air within the assembly, which is heated by the relatively hot plastic material and therefore tends to expand, during dipping. When no such vent is provided, the heated air causes detrimental bubbling and deformation within the battery assembly.

It will be evident that after the dipping is completed, the ports 22, 24 and 26 are formed by simply removing the battery from the jug in which it is dipped. The conductive leads 14 and 16 (FIG. 1) are provided, as a result of the dipping, with coatings 108 of plastic material extending outwardly from the casing 12. The coatings 108 serve as supports for the conductive leads 14 and 16 where they emanate from the casing 12, and protect the leads from being bent about a small radius which might damage the leads, by offering considerable resistance to bending. In addition, the thickness of the coatings 108 is tapered at their ends allowing the leads 14 and 16 to be gradually bent about a smaller radius in response to tension on the leads. Thus, a sharp edge at the ends of the coatings 108, which might tend to shear the leads 14 and 16, is avoided.

The foregoing will so completely describe the character of the present invention that others may, by applying current knowledge, readily adapt the same for use under varying conditions without departing from the essential features of novelty involved, which are intended to be defined and secured by the following claims.

What is claimed is:

1. A deferred action battery comprising a casing having a chamber, a plurality of cells within said chamber, each cell including a pair of electrodes, a plurality of individual spacing means disposed intermediate and in insulating engagement with only small spaced areas of each of said electrodes to maintain a predetermined spacing and a substantially unobstructed reactive space therebetween in communication with said casing chamber, and means providing a nonreactive electrolyte receiving area between said cells and adjacent to and in heat transfer relation with said reactive area.

2. The battery of claim 1 wherein said spacing means is a plurality of relatively spaced projections secured to one of said electrodes disposed intermediate said electrodes, said projections engaging only a limited area of each of said electrodes to maintain a predetermined spacing and a substantially unobstructed reactive area therebetween.

3. A battery according to claim 2, wherein said projections comprise pieces of tape attached to one of said electrodes.

4. The battery of claim 1 comprising a plurality of cells in overlying relationship, and conductive partitions therebetween.

5. The battery according to claim 4, wherein said means comprises a plurality of elongated grooves in said one electrode, said grooves opening into the area intermediate each of said cells.

6. The battery of claim 5, wherein said reactive and nonreactive electrolyte receiving areas are in heat transfer relation with adjacent cells and including a casing having spaced openings communicating with said spaces and areas.

7. The battery according to claim 6, wherein said casing is of unitary construction, a seal being formed between said casing and the peripheral portion of each of said cells to define the peripheral walls of said spaces and areas.

8. The battery according to claim 7, wherein said grooves open into the area between the electrodes of each cell and said grooved electrodes include lesser grooves on the opposite sides thereof.

9. The battery according to claim 8, wherein said openings are provided in opposed ends of said casing and in communication with said grooves.

10. A battery comprising a plurality of cells in overlying, aligned relationship, each cell having a pair of electrodes with one electrode having its marginal edges extending outwardly of the marginal edges of the other electrode, projections provided on one of said electrodes arranged to maintain a predetermined spacing and provide a substantially unobstructed reactive space between said electrodes, a casing substantially completely enclosing said battery including limited openings at opposed edges of said electrodes for admitting electrolyte to said cells, said casing sealingly engaging the marginal edges of said one electrode of each cell over substantially their entire length except for said openings, said electrodes in each cell arranged to extend between said openings, the marginal edges of said other electrode spaced inwardly from the casing thereby forming enlarged chambers extending generally coextensively with said opposed edges and in direct communication with said unobstructed reactive spaces between said electrodes, whereby electrolyte can enter through the limited openings in the casing, penetrate said chambers and be uniformly distributed to said unobstructed reactive spaces.

11. The battery according to claim 10, wherein one of said electrodes includes a first set of relatively narrow elongated grooves extending from the edges including said openings and opening into the area between said electrodes, and a second set of relatively narrow elongated grooves extending between said openings and opening onto the opposite side of said one electrode, the grooves of said second set being disposed intermediate the grooves of said first set.

12. Apparatus according to claim 10, wherein said casing is a one piece structure.

13. Apparatus according to claim 12, including a plurality of electrical conductors extending through said casing from said battery to a remote location, and a sheath surrounding each of said conductors which extends from said casing and is integral with said casing.

14. Apparatus according to claim 13, wherein each said sheath has a thickness which gradually diminishes near the terminal end of said sheath.

15. A deferred action battery comprising a plurality of cells each including an anode electrode and a cathode electrode spaced apart to define a reactive space therebetween, said cells being disposed in overlying relationship and having spaced peripheral edge portions, terminal conductors secured to selected ones of said electrodes and extending outwardly therefrom, conductive partition means disposed between the anode of one cell and the cathode of the next adjacent cell, one of said electrodes of each cell including a plurality of grooves arranged with their closed sides engaging said partition means to provide nonreactive electrolyte receiving areas intermediate adjacent cells in said battery, and a single unitary casing completely enclosing said plurality of cells, said casing having substantially parallel portions which engage substantially the entire peripheral edge portions of each of said cells including the peripheral edge portions of said partition means to form a fluid-tight seal therewith to thereby isolate said reactive spaces and to define peripheral walls forming a sealed cavity for said reactive spaces, said unitary casing being provided with openings at the edges of each of said cells to provide for the ingress and egress of electrolyte.

16. A deferred action battery comprising a plurality of cells; each including a rectangular anode electrode, a rectangular cathode electrode, one of the electrodes of each cell being larger than the other of said electrodes, spacing means disposed intermediate and in engagement with only a limited area of said cathode electrode and said anode electrode to maintain a predetermined substantially unobstructed reactive space therebetween, support means between said cells providing a nonreactive electrolyte receiving space adjacent to and in heat transfer relationship with said reactive space, and conductive partition means disposed between adjacent cells; terminal conductors secured to selected ones of said electrodes and extending outwardly therefrom; and a single unitary casing completely enclosing said plurality of cells, said casing having substantially parallel portions which engage substantially the entire peripheral edge portions of each of said larger electrodes and each of said partitions to form a fluid-tight seal therewith to thereby isolate and reactive spaces and to define peripheral walls forming a sealed cavity for said reactive space, and unitary casing being provided with openings at the edges of each of said cells to provide for the ingress and egress of electrolyte, said casing and partitions defining a distribution chamber along the edges of said cells adjacent said openings.

17. A battery according to claim 16, wherein said openings in said casing are provided in opposed faces thereof, said cathodes in each of said assemblies include a plurality of elongated grooves comprising said support means and extending between said opposed faces, said grooves engaging the partition of each assembly to provide nonreactive electrolyte receiving areas intermediate adjacent cells and opening into said unobstructed areas, and said spacing means comprise a plurality of relatively spaced pieces of electrically insulating tape connected to said anodes and arranged to engage said cathode in spaced relationship from said grooves.

18. The battery according to claim 16, wherein in each of said assemblies said partition is connected to one electrode by a peripherally disposed strip of tape, the other electrode being connected to said taped assembly, said spacing means being carried by one of said electrodes.

19. The battery according to claim 18, wherein said spacing means comprises a plurality of relatively spaced pieces of electrically insulating tape.

20. A deferred action battery comprising a casing having a chamber, at least one cell within said casing including a pair of electrodes, a plurality of individual spacing means disposed intermediate and in engagement with only small spaced areas of each of said electrodes to maintain a predetermined spacing and a substantially unobstructed reactive space therebetween in communication with said casing chamber, and means providing a nonreactive electrolyte receiving area within said casing and adjacent to and in heat transfer relation with said reactive area.

References Cited

UNITED STATES PATENTS 3,196,049    7/1965    Schilke _____ 136—90
2,938,065    5/1960    Bauer _____ 136—114 XR (Other references on following page)

UNITED STATES PATENTS

| | | | |
|---|---|---|---|
| 3,080,445 | 3/1963 | Brown | 136—135 XR |
| 2,968,686 | 1/1961 | Duddy | 136—166 XR |
| 3,061,659 | 10/1962 | Wilke et al. | 136—90 |
| 3,100,164 | 8/1963 | Solomon et al. | 136—90 |
| 3,129,118 | 4/1964 | Wilke et al. | 136—90 XR |
| 3,148,090 | 9/1964 | Saslow | 136—90 XR |
| 3,156,586 | 11/1964 | Solomon et al. | 136—90 XR |
| 3,178,316 | 4/1965 | Wilke | 136—90 XR |
| 3,185,592 | 5/1965 | Kirk et al. | 136—90 XR |
| 3,188,242 | 6/1965 | Kordesch et al. | 136—86 |
| 2,831,046 | 4/1958 | Linton | 136—175 |
| 2,900,432 | 8/1959 | Broglio | 136—90 |
| 2,931,849 | 4/1960 | Burrell | 136—175 |
| 3,102,058 | 8/1963 | Jones | 136—90 |

A. B. CURTIS, *Primary Examiner.*

A. SKAPARS, *Assistant Examiner.*

U.S. Cl. X.R.

136—100

UNITED STATES PATENT OFFICE
CERTIFICATE OF CORRECTION

Patent No. 3,451,855                                  June 24, 1969

Kenneth R. Jones et al.

It is certified that error appears in the above identified patent and that said Letters Patent are hereby corrected as shown below:

Column 1, line 34, "allow" should read -- alloy --. Column 2, line 3, "Defererd" should read -- Deferred --; line 70, "subassembly" should read -- sub-assembly --. Column 4, line 9, "nad" should read -- and --; line 30, "enocurage" should read -- encourage --. Column 6, line 41, "weter" should read -- water --; line 44, "ained" should read -- tained --; line 61, before "suitably" insert -- the --. Column 10, lines 31 and 33, "and", each occurrence, should read -- said --.

Signed and sealed this 31st day of March 1970.

(SEAL)

Attest:

Edward M. Fletcher, Jr.                         WILLIAM E. SCHUYLER, JR.

Attesting Officer                                      Commissioner of Patents